United States Patent [19]
Singh

[11] Patent Number: 5,347,167
[45] Date of Patent: Sep. 13, 1994

[54] POWER CONTROLLER USING KEYBOARD AND COMPUTER INTERFACE

[75] Inventor: Amar Singh, Brier, Wash.

[73] Assignee: Sophisticated Circuits, Inc., Bothell, Wash.

[21] Appl. No.: 987,540

[22] Filed: Dec. 7, 1992

Related U.S. Application Data

[63] Continuation of Ser. No. 564,565, Aug. 9, 1990, abandoned.

[51] Int. Cl.$^5$ .............................................. H02J 4/00
[52] U.S. Cl. ................................... 307/125; 364/493; 395/725
[58] Field of Search ............... 307/125, 116, 139, 140; 379/93, 95, 97, 98, 102; 395/725; 364/480, 483, 492, 493; 340/310 R, 310 A

[56] References Cited

U.S. PATENT DOCUMENTS

| | | | |
|---|---|---|---|
| 4,593,349 | 6/1986 | Chase et al. | 364/200 |
| 4,635,195 | 1/1987 | Jeppesen et al. | 364/200 |
| 4,647,721 | 3/1987 | Busam et al. | 379/102 |
| 4,701,946 | 10/1987 | Oliva et al. | 379/98 |
| 4,723,269 | 2/1988 | Summerlin | 379/102 |
| 4,922,450 | 5/1990 | Rose et al. | 364/900 |
| 5,198,806 | 3/1993 | Lord | 379/102 |

*Primary Examiner*—A. D. Pellinen
*Assistant Examiner*—Richard T. Elms
*Attorney, Agent, or Firm*—Russell W. Illich

[57] ABSTRACT

A power control device which incorporates a microcontroller to control the switching of power of a plurality of outlets. A host computer communicates with the microcontroller through the computer's keyboard interface to instruct the device to turn on or off one or more of the outlets either immediately or at one or more preset future times. An operator communicates with the microcontroller through the computer's keyboard intercede to instruct the device to initiate a sequence of pro-programmed on/off events.

5 Claims, 5 Drawing Sheets

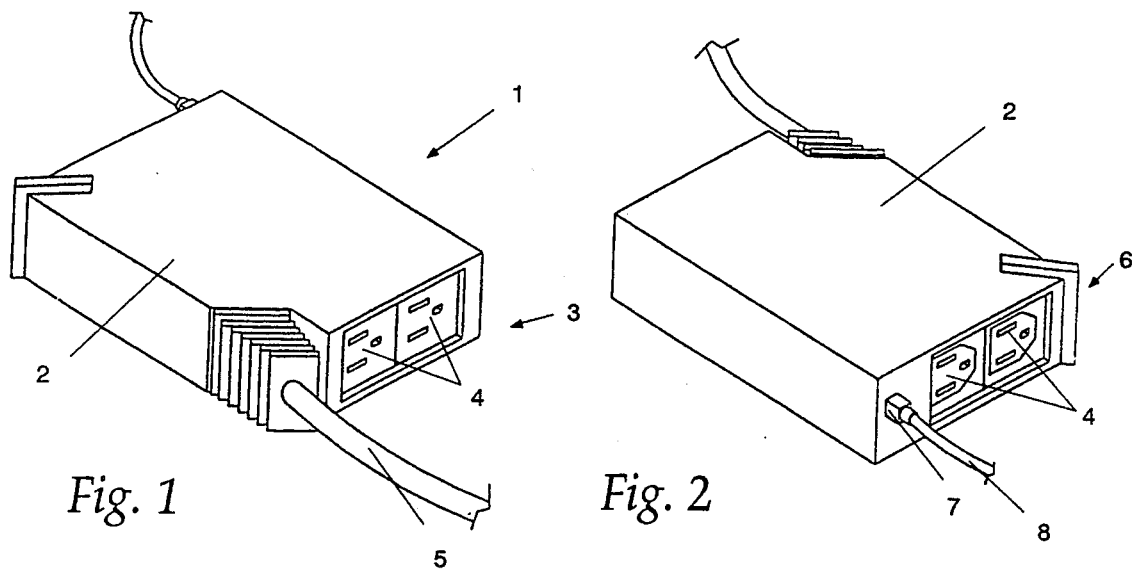
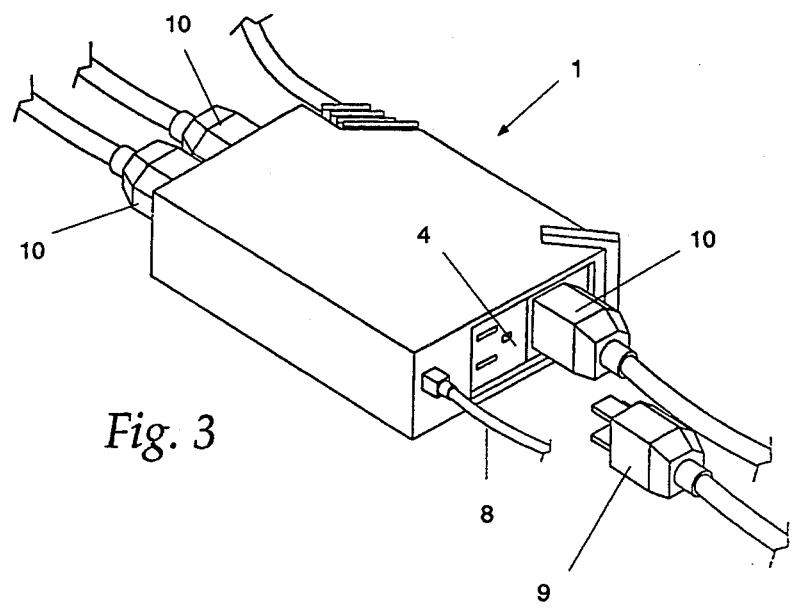

POWER CONTROLLER USING KEYBOARD AND COMPUTER INTERFACE

This application is a continuation of application Ser. No. 07/564,565 filed Aug. 9, 1990, now abandoned.

BACKGROUND OF THE INVENTION

The present invention relates to a power controller for providing power to a personal computer and associated peripheral devices. Current power controllers for personal computers primarily involve protecting the personal computer from power surges, noise that comes from standard AC power, and power outages or blackouts. These power controllers arc generally confined to outlet strips that enable a computer and several peripheral devices to be connected to the power strip which is connected directly to a standard AC wall outlet. The power strips generally include circuitry involving power surge suppression and noise filtration. Some power controllers also include backup power supply in the form of a strong battery that can sustain the computer if a power outage or blackout occurs. This conventional power controller devices function to transmit power to a computer and peripheral devices, but generally fail to involve any operative functions of the computer or its peripheral devices.

In computer systems, there is a problem of how to conveniently turn on the CPU and peripherals from the desktop. This problem is commonly handled by the use of a manually operated master switch on a conventional multi-outlet power strip. This approach however requires that the power strip be located next to the computer, something that is often undesirable. Another approach is to use a power strip which is remotely controlled by a smaller switching unit, located at the desktop. This still suffers the problem of requiring an additional piece of equipment on the desk.

One computer that addresses the issue of powering up a computer from the desktop is the Macintosh II ™ line of personal computers from Apple Computers ™. This line of computers involves a unique device for allowing the computer and its monitor to be switched on directly from its keyboard. A special key on the keyboard sends a signal to the internal power supply of the computer to power up the computer and monitor. The device also allows the computer to be shut down directly from the operating system's menu. This feature of the Macintosh II line of computers has proven very convenient to computer users. However, it has several drawbacks as far as addressing the overall supply of power to any personal computer. First, it can only power up the computer and its monitor. In today's personal computing environment, there arc a host of peripheral devices such as external drives, printers, and special input devices that are externally connected to the computer. Thus, even though the start up feature of the Macintosh II is convenient, any external peripheral devices must still be individually switched on. Second, the internal power supply of the Macintosh II doesn't provide some of the standard features of conventional power strips, such as surge suppression. Finally, the keyboard switching feature only works on the Macintosh II line of computers. Other Macintosh computers as well as other personal computers do not have such a desktop power up feature.

A second problem within the field of power control for computers is the lack of ability to turn on a computer system when no operator is present. This problem can be handled in some situations by plugging the computer system into a timed outlet. This approach does not work with all computers, as some have their own internal "soft" switching and will remain oft after power has been removed and reapplied. Also this requires a separate timer unit which again is often either inconvenient to access or in the way. And finally, such units usually very limited programmability.

A third problem often encountered is that of needing to turn on a computer system from a remote location. This need usually arises when it is necessary to retrieve information from one unattended computer via a phone modem from a computer in another location. One approach has been to use a modem to signal the computer to turn itself on. The major drawback to this approach is that it only works for computers that have the ability to turn themselves when signalled.

There has been a need within the field of power controllers tier computer devices for a unique device that handles basic power control features and additionally handles the power up of computers and peripherals.

SUMMARY OF THE INVENTION

It is an object of this invention to provide a device for handling the basic features of external power control tier personal computers including surge suppression and noise filtration.

Another object of the invention is to provide a device that allows a computer and severed peripheral devices to power up from the pressing of a key on the keyboard.

It is a further object of the invention to provide a device that would allow the computer to be turned on at a specified time to allow remote access to the computer or allow a proprogrammed set of events to occur without requiring the attention of a computer operator.

Other objects of the invention will be apparent hereinafter from the specification and from the recital of the appended claims, particularly when read in conjunction with the accompany drawings.

The present invention comprises a single external device for controlling power delivered to a computer and several peripheral devices. The device is directly connected to an AC power source and includes a plurality of outlets to connect the personal computer and least one peripheral device to the power controller device of the present invention. The device includes circuitry to suppress power surges, prevent power overloads, and filter noise that is associated with any AC power supply. The device further includes a connection between the device and a computer's special port for connecting the keyboard, mouse and other input devices to the computer. The connection of the device to the special port in addition to special circuitry within the power controller device allows the computer and peripherals to power up in response to a keystroke on the computer's keyboard. Additional timer circuitry is provided within a microcontroller of the device to allow the computer system to power up at a specified time or power up in response to a telecommunication signal for allowing remote access to the computer through a modem. The timer circuitry also allows the computer to be programmed for other scheduled on/off functions.

BRIEF DESCRIPTION OF THE DRAWINGS

FIG. 1 shows a perspective view of the power controller device of the present invention.

FIG. 2 shows an opposite perspective view of the device from the one shown in FIG. 1.

FIG. 3 shows a perspective view of the device similar to FIG. 2 with several power cords from a computer and peripheral devices connected directly to the power controller device of the present invention.

DETAILED DESCRIPTION OF THE INVENTION

Figure 4:
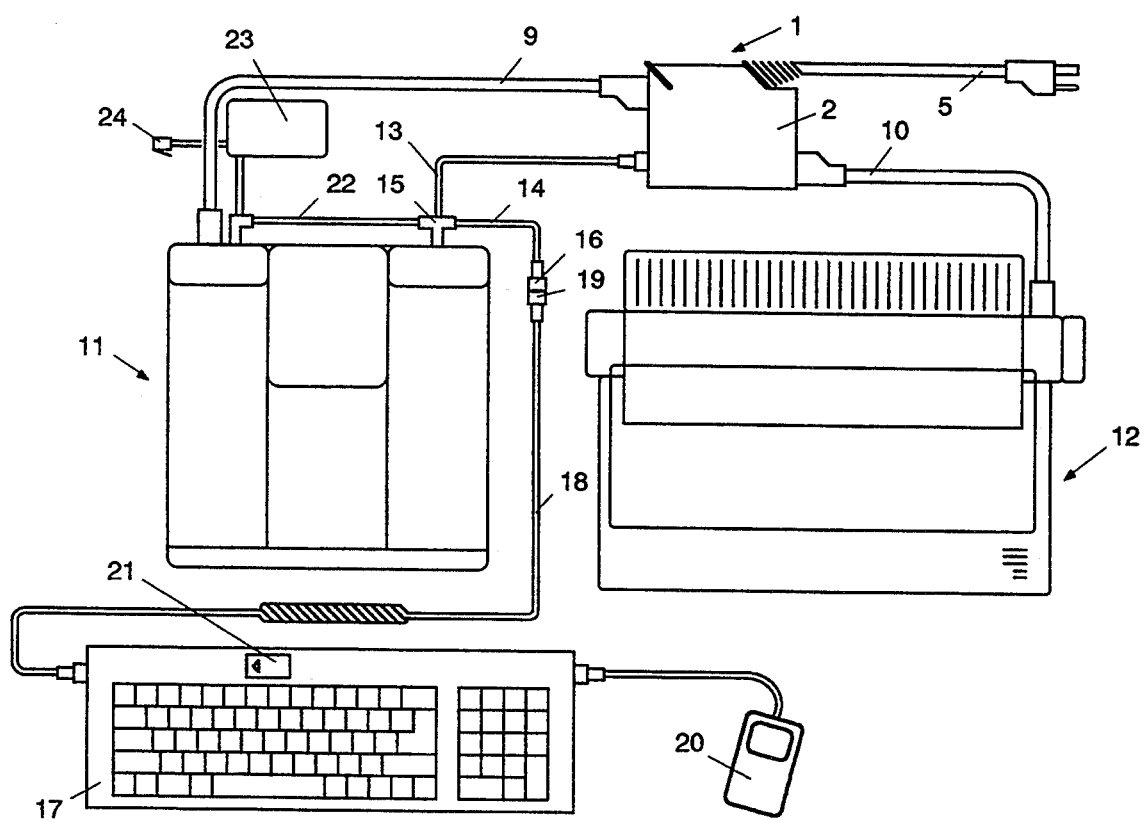
FIG. 4 shows a plan view of the power controller device in a typical application of the present invention showing its connection to a computer and one peripheral device.

FIGS. 1 and 2 show the preferred embodiment of the power controller device 1 of the present invention. The device includes an outer housing 2 that holds all of the circuitry that controls the device. On one end 3 of the housing is disposed a pair of outlets 4 into which a personal computer or peripheral device may be connected. A power cord 5 extends from the end 3 and is connected to any standard 120V AC power outlet. FIG. 2 shows an opposite end 6 of housing 2 that includes two more outlets 4. A connector 7 is also shown on the opposite end 6 for connecting a computer cable 8 to the device. The computer cable connects the power controller to one of the computer's data ports so that the power controller may send and receive instructions to and from the computer. Details of cord 8 will be explained, below.

FIG. 3 shows the device partially connected to a computer system. In this view, a computer is about to be connected to the power controller device 1 through the computer's power cord 9. The plug at the end of cord 9 is plugged into any one of the four outlets 4. Three peripheral devices are shown connected to the device 1 through their respective power cables 10. Final operative connection of the power controller device involves connecting the device's power controller cord 5 to a standard AC power outlet, and connecting the computer cable 8 to the computer. In the configuration shown in FIG. 3, the computer and all three peripheral devices can be powered up by the device 1.

FIG. 4 shows a schematic of another computer system using the same power controller device as the system shown in FIG. 3. In this system, only one peripheral device is shown for clarity reasons. The system includes a computer 11 with an integral monitor (not shown in this view). The computer is connected to the power controller device 1 through its power cable 9. A peripheral device 12, shown here as a serial printer, is also connected to the power controller device 1 through its power cord 10. The computer cable 8 is a specially configured cable: that is formed as a three leg Y-type cable. The first leg 13 of the Y-type cable 8 is connected to the computer while the second leg 14 is connected to the computer's keyboard 17. The first and second legs are joined together at a T connector 15 that connects into one of the ports of the computer. The second leg 14 of cable 8 includes a female connector head which is connected to a keyboard cable 18 through its male connector head or plug 19.

The system shown in FIG. 4 is patterned after a Macintosh SE TM personal computer made by Apple Computer TM. This type of computer has an Apple Desktop Bus TM or ADB port that allows a keyboard 17, mouse 20, or any other type of input device to be connected in series to the computer 11. The power controller device 1 of the present invention connects into the ADB port through connector 15 of the Y cable 8. It should be noted that the invention is applicable to other types of computer systems using different ports. The system shown is by way of example, only.

An optional third leg 22 of the Y cable is connected to a modem 23 which is connected to a telecommunication line by a telephone connector head 24. Leg 22 is also connected to the T connector 15. By using this optional third leg of the cable it is possible to power on the computer system remotely through the use of the modem.

Once all of the cables are connected to the computer 11, keyboard 17 and/or power controller device 1, the device is connected to an AC power supply through the power cable 5. In operation, the computer system is powered up by pressing a special key 21 of the keyboard 17. Pressing key 21 sends a signal through the ADB cords 18 and 8 to the power controller device 1. Programmable circuitry in the device can interpret this signal as a "power on" signal. The circuitry then switches the computer 11 and all peripheral devices such as printer 12 to an "on" condition. The computer system can be shut down just as easily from the computer's operating system menu which sends a signal through the ADB port to the device 1 which subsequently switches the computer and all peripheral devices to the "power off" condition.

In addition to its operative function of providing a convenient "on-off" switch for the computer system, the device also has surge suppression, overload protection, and noise filtration functions conventional on most external power controller devices. Furthermore, the power controller device 1 is also useful as a means for allowing the computer to operate without a user. The device includes timer circuitry for allowing the computer to be turned on at a specific time. Once the computer is on, a telecommunication program in combination with a modem can be programmed to dial up an on-line database and download information into the computer. This feature is very convenient for obtaining information from databases that are continuously updated, and where the computer operator does not have the time to access the database on a regular basis. One example of such a database would be a New York Stock Exchange database that continually updates a computer user on stock prices, movements, etc.

Another use of the programmable aspect of the power controller device is the ability to use the computer as a remote host computer when the user is on the road, at home, or at another office. The ability to switch on the computer at a predetermined time or directly over the modem by the use of the optional modem cable, allows the user to access any of the information in the host computer while working on a portable computer. Through the use of special communications software, a user can effectively use the portable computer as a "dumb" terminal to the host computer that is connected to the power controller device 1.

Figure 5:
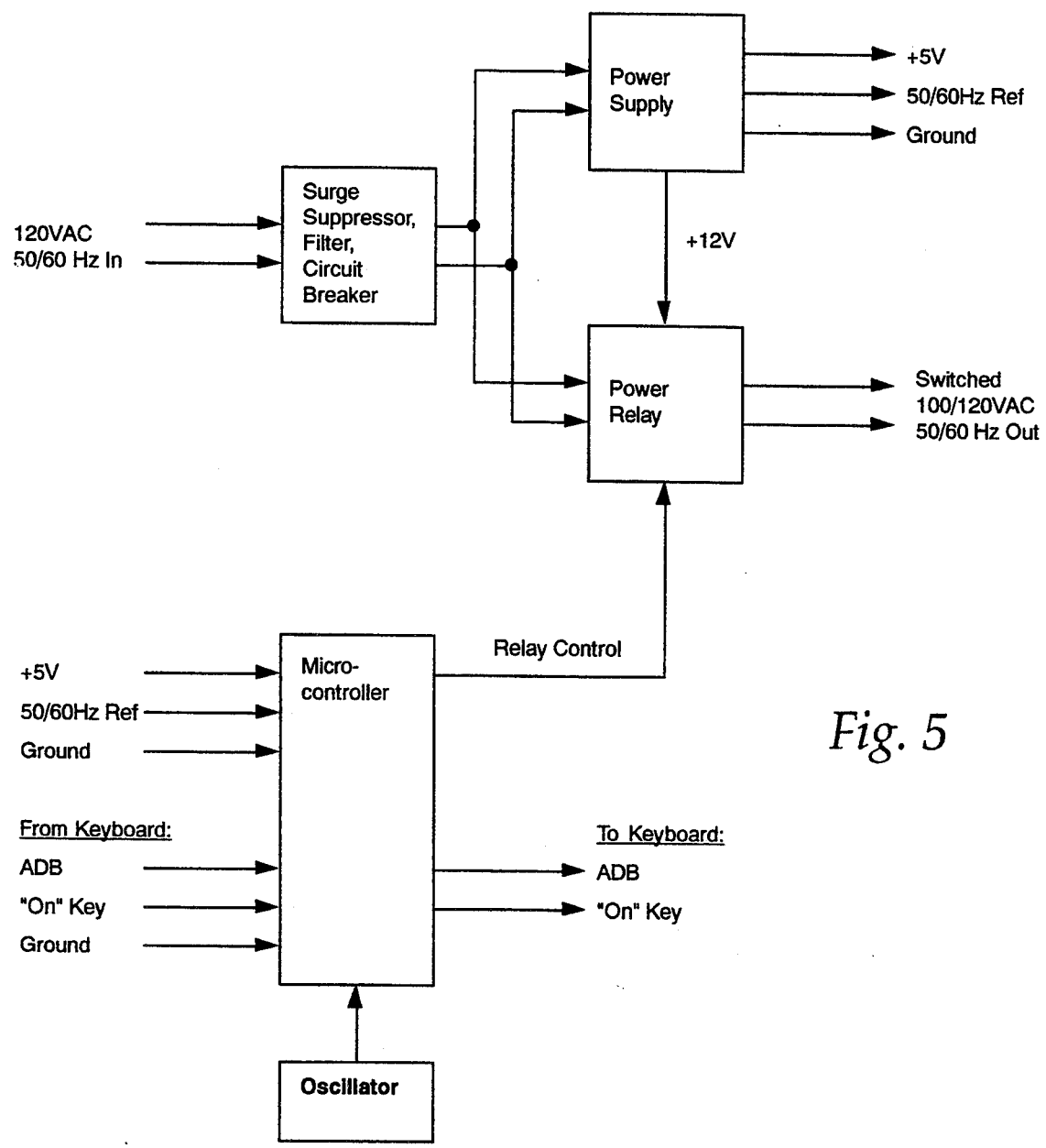
FIG. 5 shows a block diagram of the present invention showing the relationship of the various internal functions.

FIG. 5 shows a block diagram of the control elements of the present invention. AC power is first passed through a 15A circuit breaker to protect the attached equipment and the unit itself in the event an overload condition should occur. The power next passes through a simple surge suppression and noise filtration stage to reduce electrical noise and surges.

This filtered power is then passed through a power relay to the controlled receptacles as well as to an internal power supply circuit used to power the controlling electronics and to provide a timebase for the internal timekeeping. The internal power supply is always powered.

The controlling electronics consists of a microcontroller with oscillator circuitry and associated driver electronics. The microcontroller is responsible for the following functions:

1) Monitoring the keyboard, looking for the operator to press the key designated to turn the outlets on.
2) Communicating with the master computer through the keyboard interface, handling the required communications protocol. (In the case of a system based on a Macintosh SE, this protocol is called the Apple Desktop Bus TM or
3) Maintaining timing information, used to turn the outlets on or off at preset times.
4) Maintaining status information and user settings.
5) Controlling the power switching to one or more outlets.
6) Sending an "on" signal to the computer.
7) Monitoring and reporting the status of various internal and external signals to the master computer.
8) Switching the relay during power line "zero crossings" to reduce current surges and interactions between equipment.
9) Switching computer back on after a power failure.

The driver electronics are used to control the keyboard interface, the power relay(s) and to signal the computer to turn on.

The microcontroller is always on, receiving its power exclusively from the internal power supply. Using the power line frequency as a timebase, it is able to maintain real-time counters which are used for event scheduling.

Figure 6:
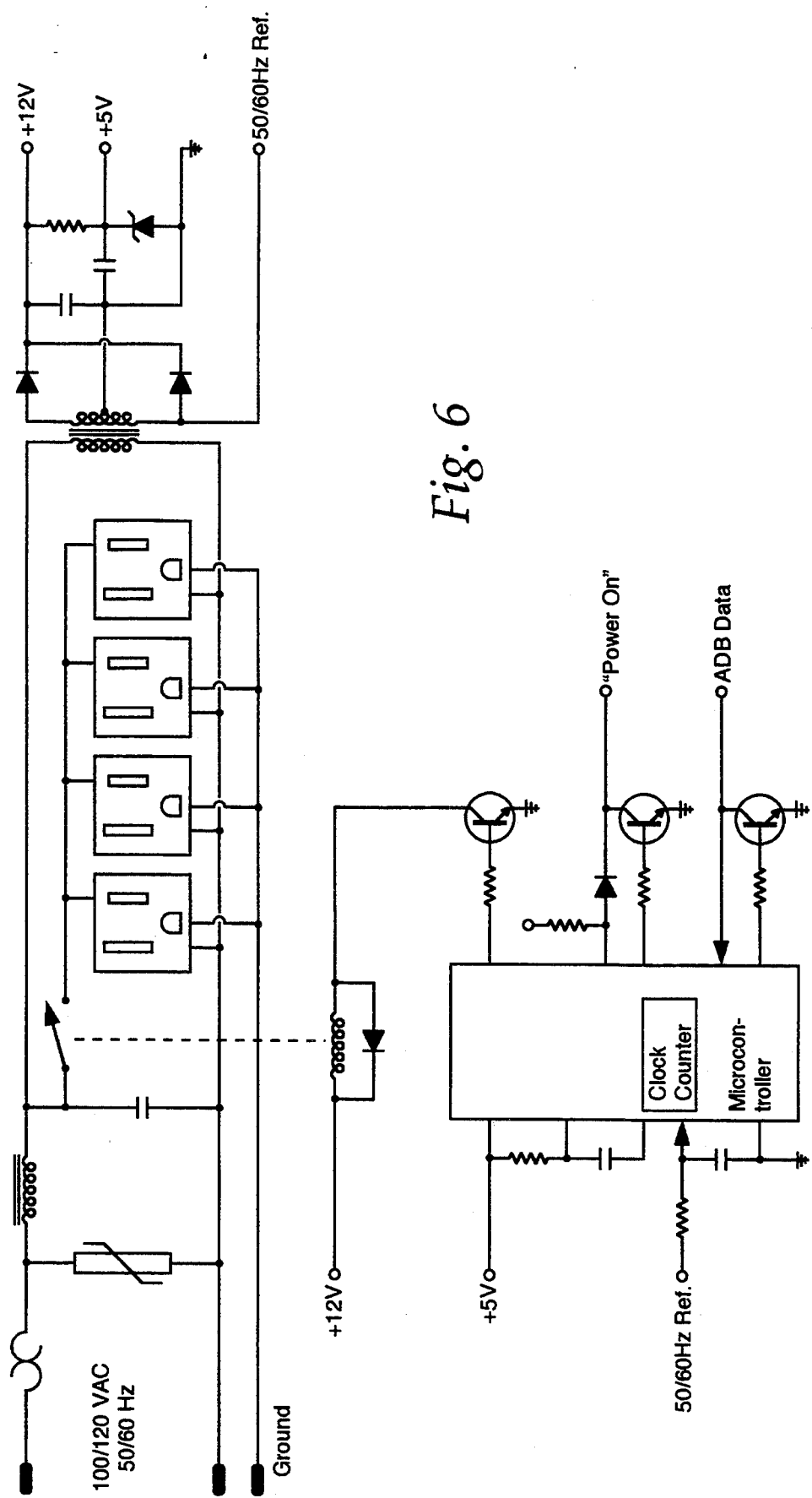
FIG. 6 is an electronic schematic diagram of the present invention.

Referring to FIG. 6, the basic electronic elements can be seen when compared to the block diagram of FIG. 5. The AC power source is shown at the upper left corner of the schematic where the AC power is passed through a surge suppressor, a noise filter and a circuit breaker to protect the computer from power overloads. These elements arc shown to the right of the AC power source. The power supply is shown in the upper right corner of the schematic and sends power to the four outlets shown next to the relay. Below the relay is shown the microcontroller which controls the relay.

The microcontroller processes information from the computer and its keyboard and opens or closes the relay in response to certain information received by the computer. In the embodiment shown, ADB data is received from the special ADB port of the Macintosh SE. The microcontroller includes read only memory, or ROM, that contains basic instructions for controlling the different elements of the power control circuitry. A microprocessor and random access memory, or RAM, is also present in the microcontroller to process the information received from ROM or from the computer.

Perhaps the most unique aspect of the power controller device is the ability to program any sequence of events once the computer is powered "on". Software that is sold in conjunction with the power controller device of the present invention allows a user to program a simulation of any number of keystrokes or input information to the computer's CPU. Additionally, this software can be used in conjunction with powerful macro programs to automate any number of computer procedures. For example, with the timer circuitry, the computer can automatically turn "on" and backup all data on a hard drive at a predetermined time every day. The entire data backup process can be automated so that one never need to attend the computer to keep their data securely backed up.

The embodiment shown was designed to work with the Macintosh SE personal computer because this computer includes a special "power on" key 21 that works effectively to power on a Macintosh II, but remains unused when connected to a Macintosh SE. The present invention is an improvement on the use of this key because not only does the power controller device allow the key to power on the computer, but it also includes conventional power controller features, allows peripheral devices to power up with the computer, and allows the power on feature to be programmed at a specific time or remote location.

The power controller device could work under other conditions too, allowing desktop power control through any input device for any computer system. For example, many computer systems include a mouse, such as the one shown in FIG. 4, as an input device. The power controller device could be programmed to respond to the pressing of the mouse button to power on a Macintosh or IBM-compatible computer. Another modification to the device would be to substitute the modem 23 of FIG. 4 with a FAX-type modem. This would alleviate the need to carry a large amount of information for people who work on the road. They only need to call up the host computer through the modem and subsequently send any information on the host computer to anyone with a FAX machine.

Figure 7:
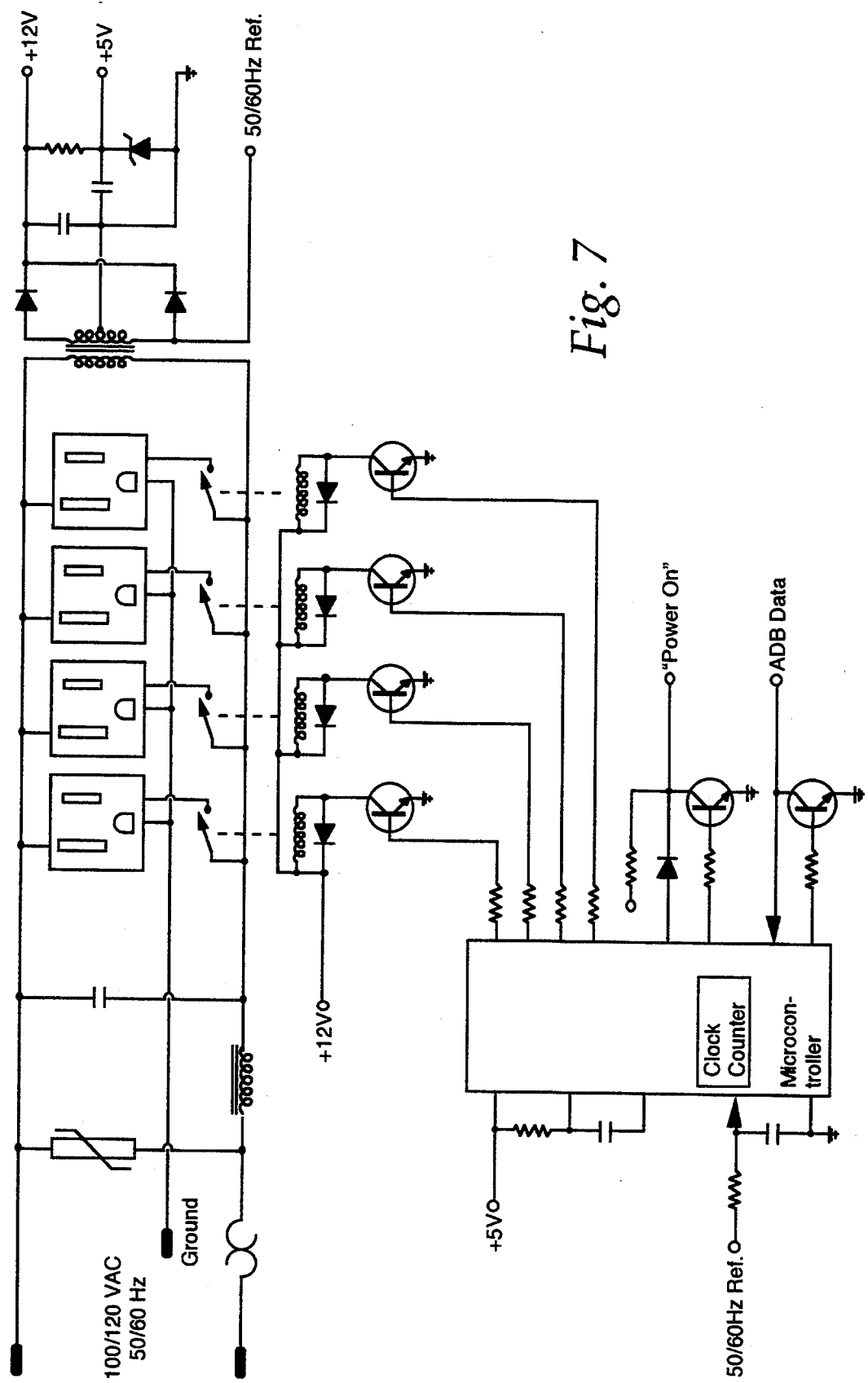
FIG. 7 shows an electronic circuit diagram of a second embodiment of the invention.

A further modification to the power controller device of the present invention would be to have individual relays on each electrical connector as shown in FIG. 7 (numbered 4 in FIGS. 1-3). By having individual relays, each connector could be programmed to be automatically switched, always "on", or manually switched on. The selective "on-off" condition of each connector would have additional applications for the power controller device. For example, the modem 23 in FIG. 4 would need to be always "on" in order to work as a remote switch for the computer. Therefore, it needs power from a separate AC power source or from an internal battery. By modifying the power controller device for selective "on-off" programming, the modem could be connected to the power controller device and its connector can be pre-programmed to be always "on". By connecting the modem to such a modified power controller device the modem would also be protected from overloads, surges, and noise.

The power control device of the present invention is a unique and useful device for many different applications in personal computing. In the early days of microcomputing the applications of these types of computers were quite limited. But today, the many and varied applications of microcomputers has brought about the need for a more useful power control device than conventional power strips.

In addition to its functional aspects there arc several physical aspects of the device that make it truly unique. The device is small in size, noiseless in its operation and can be positioned at a remote location far from the computer. Additionally, the device uses only one additional cable than conventional power strips and with the T-connector, the additional cable doesn't take up any additional ports on the computer. Its ease of installation is unique for this type of device. Finally, the use of this device saves on the wear and tear of power switches of the computer and peripheral devices. Since no manual switches need to be operated on any of the computer devices nor on the power controller device, no costly repairs of manual switches are needed with long term use of the device.

It should be apparent that many modifications could be made to the power controller device which would still be encompassed within the spirit of the present invention. It is intended that all such modifications may fall within the scope of the appended claims.

What is claimed is:

1. An external power control device for providing power to a computer having an operating system and at least one peripheral device comprising:
   a means for connecting said device to an AC power source;
   a means for suppressing surges from said AC power source;
   a plurality of connectors for allowing the computer and at least one peripheral device to be connected to said power control device:
   a means for connecting said device to a data port of the computer;
   a means for receiving a first signal from the data port;
   a means for providing power to the computer and at least one peripheral device in response to said first signal;
   said device further comprises a means for receiving a second signal from the data port and means for cutting power from the computer and at least one peripheral device in response to said second signal:
   said second signal is a shut down command sent from the operating system of the computer;
   wherein said first signal is sent to said power control device from an input device of the computer, and the input device of the computer is an individual key on a keyboard of the computer.

2. A power control device as claimed in claim 1, wherein, the keyboard is connected to the data port that sends said first signal.

3. A power control device as claimed in claim 1, wherein, said power control device further comprises a means for filtering noise from said AC power source.

4. A power control device for providing power to a computer system, comprising:
   a means for connecting said device to an AC power source;
   at least one connector for allowing the computer system to be connected to said power control device;
   a means for receiving instructions from the computer system, said instructions comprising time and date information for powering up the computer system at a pre-programmed time and date:
   a means for providing power to the computer system at said pre-programmed time and date:
   said power control device further comprises clock means for keeping current time and date information within said device, said clock means used to compare information received previously from said computer instruction to power up the computer system at said pre-programmed time and date:
   said power control device further comprises a microcontroller for storing, receiving, and processing instructions related to the power up and power off of the computer system;
   wherein, the computer system can be automatically powered on by said power control device when the computer system is unattended by any operator.

5. An external power control device for providing power to a computer and at least one peripheral device, comprising:
   a means for connecting said device to an AC power source;
   a plurality of connectors for allowing the computer and at least one peripheral device to be connected to said power control device;
   a means for selectively transmitting power to one or more of said plurality to connectors;
   a means for receiving instructions from the computer, said instructions comprising information on the selective transmission of power to the computer and any peripheral devices connected to said plurality of connectors;
   wherein, the computer and any combination of peripheral devices may be powered up selectively by said control device.

* * * * *